E. BAHR.
PIPE JOINT.
APPLICATION FILED OCT. 10, 1914.
1,134,092.
Patented Apr. 6, 1915.
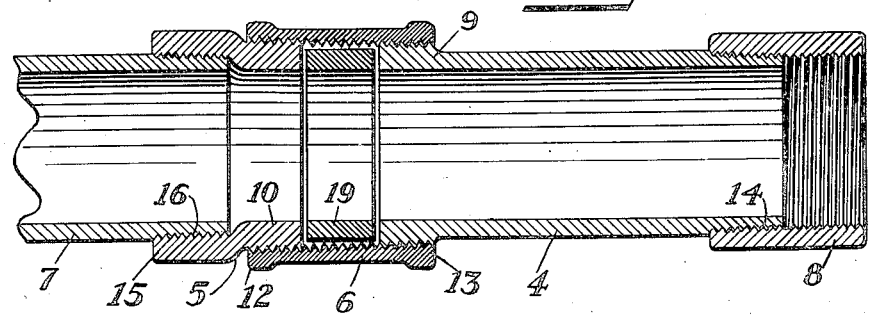
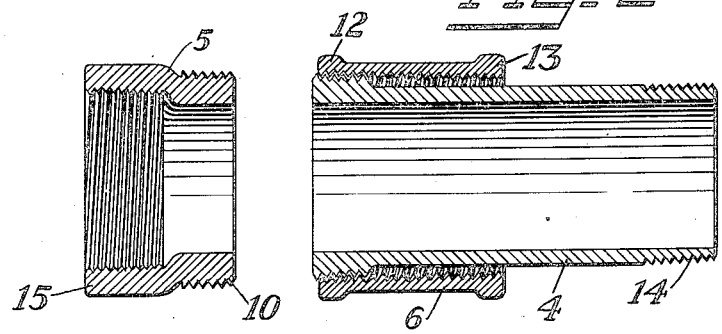
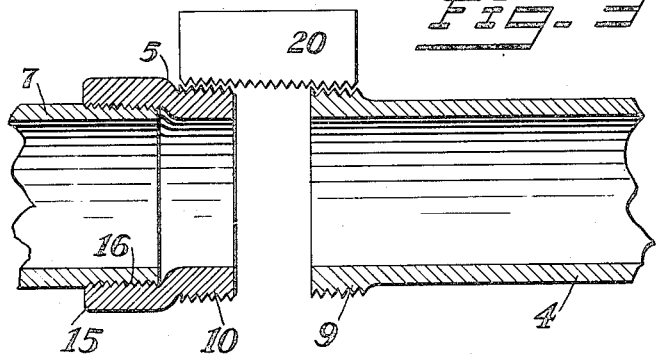
Witnesses:
Carol M. Roman
Morris Reamer
Inventor
Edwin Bahr.
By his Attorney
William H. Reid.

UNITED STATES PATENT OFFICE.

EDWIN BAHR, OF NEW YORK, N. Y.

PIPE-JOINT.

1,134,092.  Specification of Letters Patent.  Patented Apr. 6, 1915.

Application filed October 10, 1914. Serial No. 865,997.

*To all whom it may concern:*

Be it known that I, EDWIN BAHR, a citizen of the United States, and a resident of New York city, in the county of New York and State of New York, have invented certain new and useful Improvements in Pipe-Joints, of which the following is a specification.

The object of the present invention is to provide an improved form of pipe joint for connecting two portions of a line pipe that are rigid and will not yield in a longitudinal direction, by means of a form of joint that will become properly tight and locked by the mere act of screwing up of a threaded member; and which will obviate the necessity of using any kind of a packing.

In the accompanying drawing showing one embodiment of my invention, Figure 1 is a longitudinal section through the joint in place. Fig. 2 shows the three members constituting the joint, in the open position or ready for connection; and Fig. 3 shows the use of a gage plate for setting the two members of the joint with their threads in a continuous spiral.

As set forth in the drawings the invention comprises three members, a stem 4, an extension 5, and a coupling 6 by which the other two members are connected.

In Fig. 1 is shown a line pipe, comprising a pipe 7 that is attached to the extension 5; and also a sleeve 8 of a size for use with a line pipe like 7. The stem 4 is externally threaded at the end portion 9, for engaging the internal thread of the coupling sleeve 6, that is internally threaded at both ends and preferably throughout its length. The extension 5 is externally threaded at its end portion 10 to engage the internal threads of the sleeve 6 at its end portion 12. The said threaded connections between the sleeve ends 12 and 13, and the two members 4 and 5 are arranged tapering and in the same longitudinal direction; the connection at the portion 9 of the stem is made tapering but enlarged to the end of the stem, and either the stem threads, or the threads in the coupling at the ends 13 are made diverging in the direction toward the extension 5, or preferably both are made tapering in this direction. Also the threaded connection between the extension 5 and the sleeve is made tapered and converging in the same direction, that is, toward this end of the sleeve. Either the threads in the sleeve at this end 12 are made diverging toward the end; or else the threads on the portion 10 of the sleeve are made diverging away from this end portion; or preferably both of these members are made tapered in diameter at these portions. As shown in the drawing the sleeve 6 has its internally threaded portion of a regular taper or increase in diameter from the end 13 to the end 12. And the stem 14 has its threaded portion 9 made diverging toward the end and of a size to have a tight or locking fit in the end portion 13 of the coupling. The other end portion 12 of the coupling, since its internal diameter increases from the end 13 to the end 12, will be of slightly greater internal diameter at this end. Hence the internal threaded portion 10 of the extension, that is made tapered and increases slightly in diameter from its extremity back, will have a slightly greater diameter than the threaded portion 9 of the sleeve, for the purpose of having a tight or locking fit on the extension portion 10.

The stem 4 is shown as externally threaded at its rear end 14 and engaging a coupling 8. The extension 5 is arranged to engage with a line pipe of a size fitting the coupling 8, and hence is enlarged as shown at 15, and internally threaded to connect with the line pipe 7, whose end portion screwing into this extension would also screw into the coupling 8.

In the use of the device the stem 4 first has the coupling 6 passed on to the body portion 4 that is preferably of less diameter than the tapered end portion 9. And the sleeve will pass over the threaded portion 14 without engaging such threads. Since the end portion 12 of the sleeve is of larger diameter than the end portion 13, it will loosely engage the threaded end 9 of the stem, and it will be understood that as the coupling is screwed up from this position shown in Fig. 2, to the locking position shown in Fig. 1, since the diameter decreases, it will have a locking engagement in the latter position. After the coupling is brought to the position indicated in Fig. 2, with the two end portions of the members adjacent, the stem 4 has its threaded end 14 attached to the line pipe, as by screwing it tight into the sleeve 8. The extension 5 is to be screwed on to the line pipe 7 at its threaded end 16, and the latter is so cut and threaded, that when the extension is placed thereon as indicated in Fig. 1, the stem 4 and the extension 5 will be spaced on the proper distance. Of course, this is a matter of fitting, and also has some bearing on the action of the stem 4 with the coupling 8. After the extension 5 is screwed on to the line pipe 7, it will be understood that these two members 4 and 5 are rigidly held as indicated in Figs. 2 and 3, the coupling 6 being at this time in the position indicated in Fig. 2. The next operation is to screw up the coupling 6, and as it is advanced along the threaded stem 4, it will approach and engage the threaded portion 10 of the extension, and upon engagement of the threads will screw on to the stem to lock on to the extension as indicated in Fig. 1. But this operation will not in any way affect the relative positions of the stem 4 or the extension 5, that as stated have been locked on to the two portions of the line pipe, and hence a very tight connection between both members is effected, without any strain on the line pipe.

It is obvious that the same thread is used from end to end in the sleeve 6, and hence the same threads are used on the stem and extension for engagement with the coupling. Therefore when the coupling 6 is screwed up to the position shown in Fig. 2 to engage the threaded end of the extension, it may be that the two threads about to engage will not be in the proper relative position, and the movement back and forth of the coupling will not vary this position. In other words it is practically necessary that the threaded portions of the stem and extension must now lie in a continuous spiral. If a thread gage 20, that is, a plate having teeth corresponding to the teeth of the threaded portion of the stem and extension, were brought to engage the stem and extension, the teeth would properly come together as indicated in Fig. 3 provided the threads on the stem and extension were in a continuous spiral. But if such is found not to be the case, then it is necessary to move one of these members so as to dispose the threads in such theoretical spiral. To do this by shifting the extension or the stem relative to the line pipe, it is necessary to have such threaded extension of a different thread, that is of a different pitch. For instance if the thread in the coupling is one measuring 12 threads to the inch, then the threaded connection between the extension and the line pipe 7 must be of a different pitch, that is, a greater or less number of threads to the inch. As shown the threaded connection at 16 is made of a greater number, such as 16 threads to the inch. Therefore it will be understood that slightly turning the extension on the line pipe 7 will bring the threads on the portion 10 of the extension into the proper spiral line, to properly receive the teeth of the gage 20. After this has been done the sleeve 6 can be screwed up to the position of Fig. 1 and tightly locked on both members.

If desired a washer or sleeve 19 can be placed inside of the coupling 6 between the ends of the members 4 and 5, whose internal diameter is the same as that of the sleeve and extension. This is for the purpose of filling the channel that would be left in the pipe, and make the bore of the joint between the line pipe 7, and the stem 4 practically continuous.

Having thus described my invention what I claim is:

1. In combination with a pair of alined pipe members such as a threaded pipe and connection internally threaded so as to fit the pipe, of a coupling nipple having its shank similar to the line pipe and threaded at the rear end to fit the line connection, the coupling nipple having its other end enlarged and externally threaded, such enlargement tapering inwardly, a coupling sleeve having an internal thread tapering from one end to the other and adapted to engage the said enlarged end to the coupling nipple to lock thereon at its smaller end portion, and an extension sleeve having a reduced end whereby inner and outer shoulders are provided at its middle portion for engagement respectively with the said pipe member and said coupling nipple, said extension sleeve having its reduced portion tapering toward the end thereof and externally threaded to engage in the larger end of the threaded bore of the coupling sleeve, said extension sleeve having its bore threaded at the larger end portion for engagement with the said threaded pipe member, said extension sleeve having the bore of the reduced portion in alinement with the said pipe member and with the bore of the said coupling nipple.

2. In combination with a pair of alined pipe members such as a threaded pipe and a connection internally threaded so as to fit the pipe, of a coupling nipple having its shank similar to the line pipe and threaded at the rear end to fit the line connection, the coupling nipple having its other end enlarged and externally threaded, such enlargement tapering inwardly, a coupling sleeve having an internal thread tapering from one end to the other and adapted to engage the said enlarged end of the coupling nipple to lock thereon at its smaller end portion and an extension sleeve having a reduced end whereby inner and outer shoulders are provided at its middle portion for engagement respectively with the said pipe member and said coupling nipple, said extension sleeve having its reduced portion tapering toward the end thereof and externally threaded to engage in the larger end of the threaded bore of the coupling sleeve, said extension sleeve having its bore threaded at the larger end portion for engagement with the said threaded pipe member, said extension having the bore of the reduced portion in alinement with the said pipe member and with the bore of the said coupling nipple and a washer interposed between the reduced end of the extension sleeve and the end of the coupling nipple to form a substantially continuous bore for the device.

3. In combination with a pair of alined pipe members such as a threaded pipe and a connection internally threaded so as to fit the pipe, of a coupling nipple having its shank similar to the line pipe and threaded at the rear end to fit the line connection, the coupling nipple having its other end enlarged and externally threaded, such enlargement tapering inwardly, a coupling sleeve having an internal thread tapering from one end to the other and adapted to engage the said enlarged end of the coupling nipple to lock thereon at its smaller end portion, and an extension sleeve having a reduced end whereby inner and outer shoulders are provided at its middle portion for engagement respectively with the said pipe member and said coupling nipple, said extension sleeve having its reduced portion tapering toward the end thereof and externally threaded to engage in the larger end of the threaded bore of the coupling sleeve, said extension sleeve having its bore threaded at the larger end portion for engagement with the said threaded pipe member, said extension sleeve having the bore of the reduced portion in alinement with the said pipe member and with the bore of the said coupling nipple, the internal threads of the extension being of a different pitch from the external threads on the extension sleeve and from the threads of the coupling sleeve.

EDWIN BAHR.

Witnesses:
   EDW. F. SWEENEY,
   JAMES LOCKWOOD.